(12) United States Patent
Downs et al.

(10) Patent No.: US 11,090,557 B2
(45) Date of Patent: Aug. 17, 2021

(54) ALL IN ONE MOBILE GAME CONTROLLER

(71) Applicant: StarAgilis Limited, Hong Kong (CN)

(72) Inventors: Alexzander Earl Downs, Hong Kong (CN); Norman Brown, Hong Kong (CN)

(73) Assignee: StarAgilis Limited, Hong Kong (CN)

( * ) Notice: Subject to any disclaimer, the term of this patent is extended or adjusted under 35 U.S.C. 154(b) by 848 days.

(21) Appl. No.: 15/754,590

(22) PCT Filed: Oct. 24, 2016

(86) PCT No.: PCT/IB2016/056365
§ 371 (c)(1),
(2) Date: Feb. 23, 2018

(87) PCT Pub. No.: WO2018/078414
PCT Pub. Date: May 3, 2018

(65) Prior Publication Data
US 2020/0238167 A1  Jul. 30, 2020

(51) Int. Cl.
*A63F 13/24*  (2014.01)
*A63F 13/92*  (2014.01)

(52) U.S. Cl.
CPC .............. *A63F 13/24* (2014.09); *A63F 13/92* (2014.09)

(58) Field of Classification Search
CPC ................................. A63F 13/24; A63F 13/92
See application file for complete search history.

(56) References Cited

U.S. PATENT DOCUMENTS

| | | | | |
|---|---|---|---|---|
| 8,012,016 B2* | 9/2011 | York | ...................... | A63F 13/48 463/31 |
| 8,894,484 B2* | 11/2014 | Latta | ..................... | A63F 13/212 463/29 |
| 8,905,855 B2* | 12/2014 | Fitzpatrick | .............. | G06T 13/40 473/199 |
| 9,005,025 B2* | 4/2015 | Joynes | .................... | A63F 13/24 463/37 |
| 9,407,100 B2* | 8/2016 | Joynes | ...................... | H02J 7/00 |

(Continued)

FOREIGN PATENT DOCUMENTS

| CN | 101612475 A | 12/2009 |
|---|---|---|
| CN | 201632032 U | 11/2010 |

(Continued)

OTHER PUBLICATIONS

"Wireless HDMI", Wikipedia [online] [retrieved on Nov. 8, 2019] retrieved from Internet <URL: https://en.wikipedia.org/w/index.php?title=Wireless_HDMI&oldid=682356200> Originally published on Sep. 23, 2015 (Sep. 23, 2015); p. 1.

(Continued)

*Primary Examiner* — Omkar A Deodhar
*Assistant Examiner* — Matthew D Hoel
(74) *Attorney, Agent, or Firm* — Eagle IP Limited; Jacqueline C. Lui

(57) ABSTRACT

One example embodiment is a game controller that includes a body and a motherboard. The motherboard includes a central processing unit (CPU) and a graphics processing unit (GPU) that execute a software game and transmit generated game image data directly to an external display without requiring a separate game console.

18 Claims, 5 Drawing Sheets

(56) References Cited

U.S. PATENT DOCUMENTS

| | | | |
|---|---|---|---|
| 9,504,911 B2 * | 11/2016 | Hackney | A63F 13/24 |
| 9,690,392 B2 * | 6/2017 | Igarashi | G06F 3/0338 |
| 9,789,395 B2 * | 10/2017 | Igarashi | A63F 13/23 |
| 9,795,874 B2 * | 10/2017 | Hackney | A63F 13/24 |
| 9,908,040 B2 * | 3/2018 | Hackney | A63F 13/22 |
| 10,139,944 B2 * | 11/2018 | Wright | G06F 3/03547 |
| 10,183,217 B2 * | 1/2019 | Chen | G06F 3/014 |
| 10,286,306 B2 * | 5/2019 | Okamura | A63F 13/25 |
| 10,335,675 B2 * | 7/2019 | Suetake | A63F 13/24 |
| 10,427,037 B2 * | 10/2019 | Strahle | A63F 13/98 |
| 10,441,878 B2 * | 10/2019 | Kaneko | A63F 13/245 |
| 10,456,669 B2 * | 10/2019 | Okamura | A63F 13/235 |
| 10,507,386 B2 * | 12/2019 | Igarashi | G06F 3/0338 |
| 10,518,172 B2 * | 12/2019 | Chen | G06F 3/012 |
| 10,525,350 B2 * | 1/2020 | Shiraiwa | A63F 13/26 |
| 10,537,795 B2 * | 1/2020 | Bristol | A63F 13/25 |
| 10,653,947 B2 * | 5/2020 | Matsuzaki | A63F 13/211 |
| 10,737,171 B2 * | 8/2020 | Strahle | A63F 13/22 |
| 10,780,343 B2 * | 9/2020 | Chou | A63F 13/98 |
| 10,806,997 B2 * | 10/2020 | Winick | H02J 7/342 |
| 10,814,222 B2 * | 10/2020 | Hutchens | A63F 13/23 |
| 10,835,811 B2 * | 11/2020 | Tsuchiya | A63F 13/285 |
| 10,864,436 B2 * | 12/2020 | Okamura | A63F 13/24 |
| 10,870,053 B2 * | 12/2020 | He | A63F 13/426 |
| 10,874,938 B2 * | 12/2020 | Strahle | A63F 13/22 |
| 10,894,208 B2 * | 1/2021 | Bristol | A63F 13/25 |
| 10,912,990 B2 * | 2/2021 | Higgins | A63F 13/214 |
| 10,912,993 B2 * | 2/2021 | Guerrero, Jr. | G05G 5/04 |
| 10,967,252 B2 * | 4/2021 | Ironmonger | A63F 13/22 |
| 10,981,052 B2 * | 4/2021 | Kuwatani | H04L 51/04 |
| 10,981,067 B2 * | 4/2021 | Kuwatani | A63F 13/26 |
| 2014/0018173 A1 | 1/2014 | Urhman | |

FOREIGN PATENT DOCUMENTS

| | | | |
|---|---|---|---|
| CN | 102198327 | A | 9/2011 |
| CN | 203954652 | U | 11/2014 |
| CN | 104335172 | A | 2/2015 |
| CN | 104822429 | A | 8/2015 |
| CN | 105893800 | A | 8/2016 |
| DE | 102015203523 | A1 | 9/2016 |
| EP | 2857963 | A1 | 4/2015 |
| JP | 2004201728 | A | 7/2004 |
| JP | 3619517 | B2 | 2/2005 |
| JP | 2013250807 | A | 12/2013 |
| WO | 2014085714 | A1 | 11/2013 |
| WO | 2014085714 | A1 | 6/2014 |

OTHER PUBLICATIONS

Chris Hoffman: "How to Play Any Game in VR With SteamVR's Desktop Theater Mode",How-To Geek [online] retrieved on Nov. 8, 2019] retrieved from Internet <URL: https://www.howtogeek.com/270017/how-to-play-any-game-in-vr-with-steamvrs-desktop-theater-mode/> Originally published on Sep. 21, 2016 (Sep. 21, 2016): p. 1.

"Nintendo Switch 能帮任天堂打一个漂亮的翻身仗吗？", Gamersky[online] [retrieved on Apr. 21, 2021] retrieved from Internet <URL: https://www.gamersky.com/zl/industrial/201610/824144.shtml> Originally published on Oct. 21, 2016 (Oct. 21, 2016); p. 13.

"PSO2のナゾを勝手に考察する！", 第3回 PSO2で最適のボイスチャットを探す！, 週刊アスキー—[online] [retrieved on Aug. 31, 2020] retrieved from Internet <URL: https://weekly.ascii.jp/elem/000/002/615/2615273/> Originally published on May 10, 2013 (May 10, 2013).

* cited by examiner

ALL IN ONE MOBILE GAME CONTROLLER

FIELD OF THE INVENTION

The present invention relates to gaming, and in particular to an all in one mobile game controller that communicates directly with an external display for game image viewing.

BACKGROUND

Video games are popular among a wide range of age groups. Conventionally, a game controller is a device used with games or entertainment systems to provide input to a video game, typically to control an object or character in the game. A controller is usually connected to a game console or computer by means of a wire or cord, although, since the mid-2000s, wireless controllers have become widespread. Input devices that have been classified as game controllers include general game controllers (X-Box, PS4, Gamevice types), keyboards, mice, gamepads, joysticks, wans, data gloves. Special purpose devices, such as steering wheels for driving games and light guns for shooting games, are also game controllers.

New systems and methods that assist in advancing technological needs and provide better user experience are desirable.

SUMMARY OF THE INVENTION

One example embodiment is a game controller that includes a body and a motherboard. The motherboard includes a central processing unit (CPU) and a graphics processing unit (GPU) that execute a software game and transmit generated game image data directly to an external display.

Other example embodiments are discussed herein.

DETAILED DESCRIPTION

Figure 1:
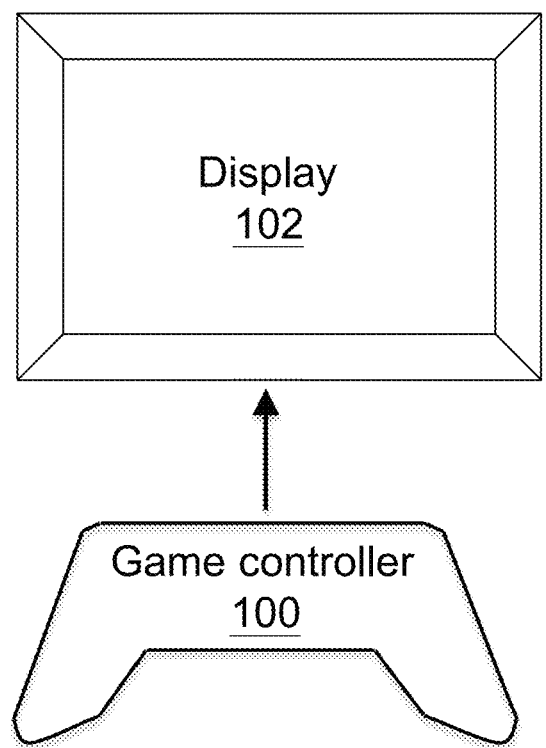
FIG. 1 shows a game controller that communicates with an external display in accordance with an example embodiment.

Example embodiments relate to apparatus and methods that provide a game controller that processes a software game directly without an external computing device as intermediary and transmits the generated game image to an external display for viewing. The game controller can process and execute software games and transmit game image data directly to a display without requiring a separate game console. The separate game console is not required since the game controller performs functions of both a game controller and a game console.

A game console, video game console, or console is a term used to describe a gaming box or device that is primarily designed to connect to both a game controller and to a television (TV) or other display.

An example embodiment includes a game controller having a horseshoe-shaped, C-shaped, wand shape, or other shaped body or housing that fits in one or two hands of a user. For example, the body has a shape adapted to be held in both hands while the user plays games with the game controller. As another example, the body of the game controller can be two separate components and held separately in each hand, such as one component adapted to be fit in a left hand of the user and one component adapted to be fit in the right hand of the user while the user plays games or performs other functions with the game controller.

The body includes a cover and a base with a plurality of buttons arranged on the body that are actuated by a user to play a software game. The game controller also has a motherboard and a battery that are disposed or arranged within the body. The motherboard includes a plurality of electronic components, modules, or chips to execute a game program directly, without the necessity of an additional external computing device or module (e.g., a separate game console), such that game images are created or generated for the user that watches to play the game.

The plurality of buttons can be designed with flexibility in terms of a variety of aspects such as position, function, shape and size. In an example embodiment for example, one or more buttons, such as directional buttons, analog stick buttons and trigger buttons, are disposed or arranged on the first side of the body and are holdable by a left hand of a user. One or more buttons, such as face buttons, analog stick buttons and trigger buttons, are disposed on the second side opposite the first side of the body and are holdable by a right hand of the user.

In an example embodiment, a plurality of electronic components, modules, or chips are arranged on the motherboard, including one or more of a memory, a central processing unit (CPU), a graphics processing unit (GPU), a High-Definition Multimedia Interface (HDMI), a wireless Microcontroller Unit (MCU) and a Bluetooth MCU.

As an example, the memory stores a software game. The CPU fetches game instructions from the soft game and decodes or processes the instructions into game data, and then transmits the game data to the GPU. The GPU executes the received game data to generate game image data that transmits through the HDMI directly to the external display that the user watches to play the software game. The software game is processed by the game controller itself and the generated game image data is directly transmitted to an external display for viewing without an additional computing device such as a game console as an intermediary or assistive electronic device. An example embodiment thus eliminates a need for a separate game console since the game controller performs the CPU and GPU executions and transmits data to the display (e.g., via a wired connected to the display or a wireless connection to the display).

The game data includes drawing and/or video instructions that render video imagery of gameplay of the software game. The game image data are the rendered image frames of the software game. By way of example, the image frames that are output from the GPU are raw or uncompressed image data.

The game controller communicates with a network via the wireless MCU.

In an example embodiment, the wireless MCU establishes Wi-Fi connection with a wireless network such as Bluetooth or the Internet. As an example, the game controller downloads one or more software games from a server via the Internet and stores these games in its memory. With connection to the Internet, for example, a software game stored in the memory of the game controller is also updated automatically or manually when a new version is detected. As another example, the game controller is able to connect to a multiplayer gaming platform, such as an online gaming platform, such that a user or gamer plays games with other users. The game controller also communicates with another Bluetooth enabled device or accessory via the Bluetooth MCU. By way of example, the Bluetooth MCU enables wireless communication with another Bluetooth enabled device, such as a Bluetooth earphone and a Bluetooth speaker.

In an example embodiment, the game controller can run on a variety of platforms such as the Microsoft mobile platform and the Android mobile platform. The game controller supports various software including, but not limited to, Microsoft office, email, and browser such as Chrome. As an example, the game controller embeds a software converter that converts a two-dimensional (2D) game to Side by Side (SBS) VR content.

In an example embodiment, the battery of the game controller is rechargeable. The game controller includes two Universal Serial Bus (USB) jacks, one for charging the battery and the other one for communicating with an external electronic device or peripherals such as a smartphone and a virtual reality (VR) headset.

In some example embodiments, the game controller includes one or more other components or elements. As an example, a Liquid Crystal Display (LCD) monitor is disposed or arranged on the cover of the game controller and displays game images of a software game while a user plays the game. As another example, the game controller includes a Subscriber Identity Module (SIM) card port that receives a SIM card and enables the user to be provided with a paid network service such as a 4G LTE service from a service provider. As a further example, the game controller includes a speaker that plays sounds from the software game while the user plays the software game and a microphone that receives, while the user plays a software game, spoken language from the user, when the game controller wirelessly transmits the spoken language over a network to other gamers playing the software game.

FIG. 1 shows a game controller 100 that communicates directly with an external display 102 in accordance with an example embodiment. The game controller 100 has computing, components, modules, or chips and processes a software game without an additional external computing device such as a game console as intermediary in order to generate game images that are viewable on the display 102 for a user or gamer. By way of example, the display 102 includes, but is not limited to, a VR head mounted display (HMD), an augmented reality (AR) display, a television (TV) display or screen, and a computer monitor.

As an example, the game controller 100 can be a VR all-in Mobile Game Console with full controller functions. Not only does the game controller 100 have the full functionality of a general game controller, but also includes a graphics processing unit (GPU) and central processing unit (CPU) to execute VR games By way of example, the game controller 100 is compatible with a variety of different VR Headgear. The game controller 100 includes enough memory for downloaded VR games and other VR entertainment. The game controller 100 also has the capability to stream VR Content including Games and Movies from VR Content providers. By way of example, the game controller 100 can link up to various displays or monitors such as TVs (monitors) by HDMI, or Wireless Display to play downloaded or streaming games as if one were playing with a Home Game Console.

Figure 2:
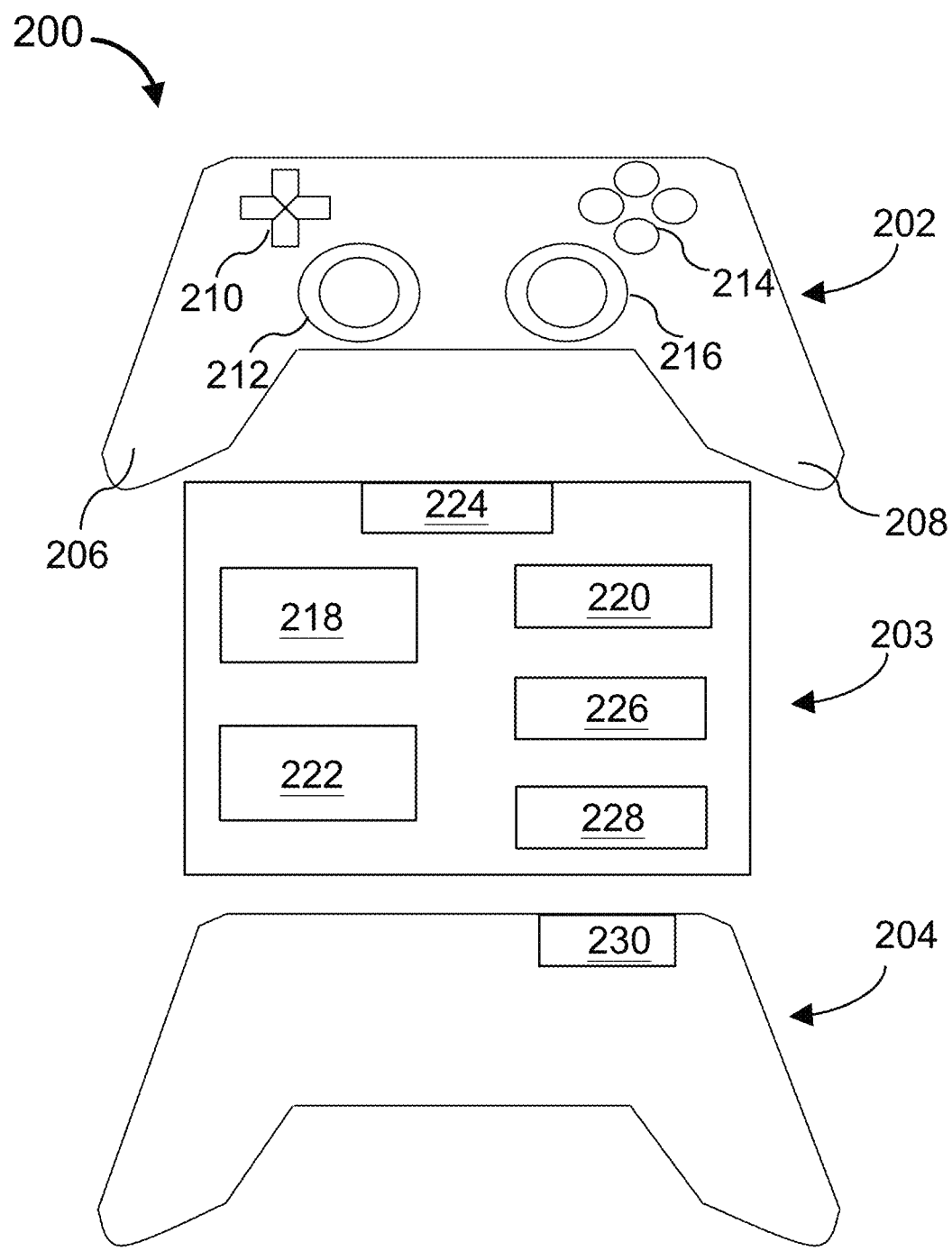
FIG. 2 shows a schematic exploded view of a game controller in accordance with an example embodiment.

FIG. 2 shows a schematic exploded view of a game controller 200 in accordance with an example embodiment. The game controller 200 has a body or housing or enclosure with a cover or lid 202 and a base or bottom cover 204. Buttons 210 and 212 are positioned or arranged on the left side 206 of the game controller 200 and are holdable and actuated with a left hand of a user or gamer. Buttons 214 and 216 are positioned or arranged on the right side 208 of the game controller 200 and are holdable and actuated with a right hand of the user or gamer.

As shown illustratively in FIG. 2, the game controller has a motherboard 203 that includes a CPU 218, a GPU 220, a memory 222, a HDMI 224, a wireless MCU 226 and a Bluetooth MCU 228. By way of example, the CPU 218 fetches or retrieves game instructions from a software game that is stored in the memory 222, and decodes or processes the instructions into game data to be transmitted to the GPU 220. The game data includes drawing instructions that render video imagery of gameplay of the software game. The GPU 220 processes or executes the game data received from the CPU 218 to generate game image data that transmits through the HDMI 224 to an external display that the user or gamer watches to play the software game. The game image data are the rendered image frames of the software game. Without the necessity of an external computing device, the game controller 200 itself executes software game programs and creates game image data that is directly transmitted to an external display for viewing by the user that plays the software game. By way of example, the external display includes, but is not limited to, a VR HMD, an AR display, a TV display or screen and a computer monitor.

With the assistance of the wireless MCU 226, the game controller 200 communicates with a network such as Ethernet and the Internet. For example, the wireless MCU 226 enables the game controller 200 to connect or couple to the Internet to download a software game, to update the software game that already exists in the memory 222 and to play online games with other online gamers or game players. The game controller 200 also communicates with another Bluetooth enabled device or accessory via the Bluetooth MCU 228. For example, the Bluetooth MCU 228 enables the game controller 200 to communicate with another Bluetooth enabled device such as a Bluetooth earphone, a Bluetooth speaker, a Bluetooth microphone, and a Bluetooth VR headset. This expands the functionality of the game controller 200 and improves user experience.

As shown in FIG. 2, the game controller 200 includes a battery 230 that supplies power to the game controller 200. The battery 230 can be a non-rechargeable battery such as an AA battery and an AAA battery, or a rechargeable battery such as a Lithium-ion battery. In this manner, it is unnecessary to connect the game controller 200 to a power source or power charger when the user plays a game. In some situations, such as in outdoor place, it is inconvenient or impossible to connect to a power source to power the game controller 200 to play games.

In an example embodiment, the HDMI is a wireless HDMI with an embedded wireless HDMI transmitter (not shown). In this manner, for example, the game controller 200 is able to transmit or convey the game image data wirelessly to an external display with a wireless HDMI receiver.

By way of example, the game controller 200 has a C-shaped, a horseshoe-shaped body, or other shape that can fit in the hands of a user (e.g., a rectangular shape, an oval shape, etc.).

Figure 3:
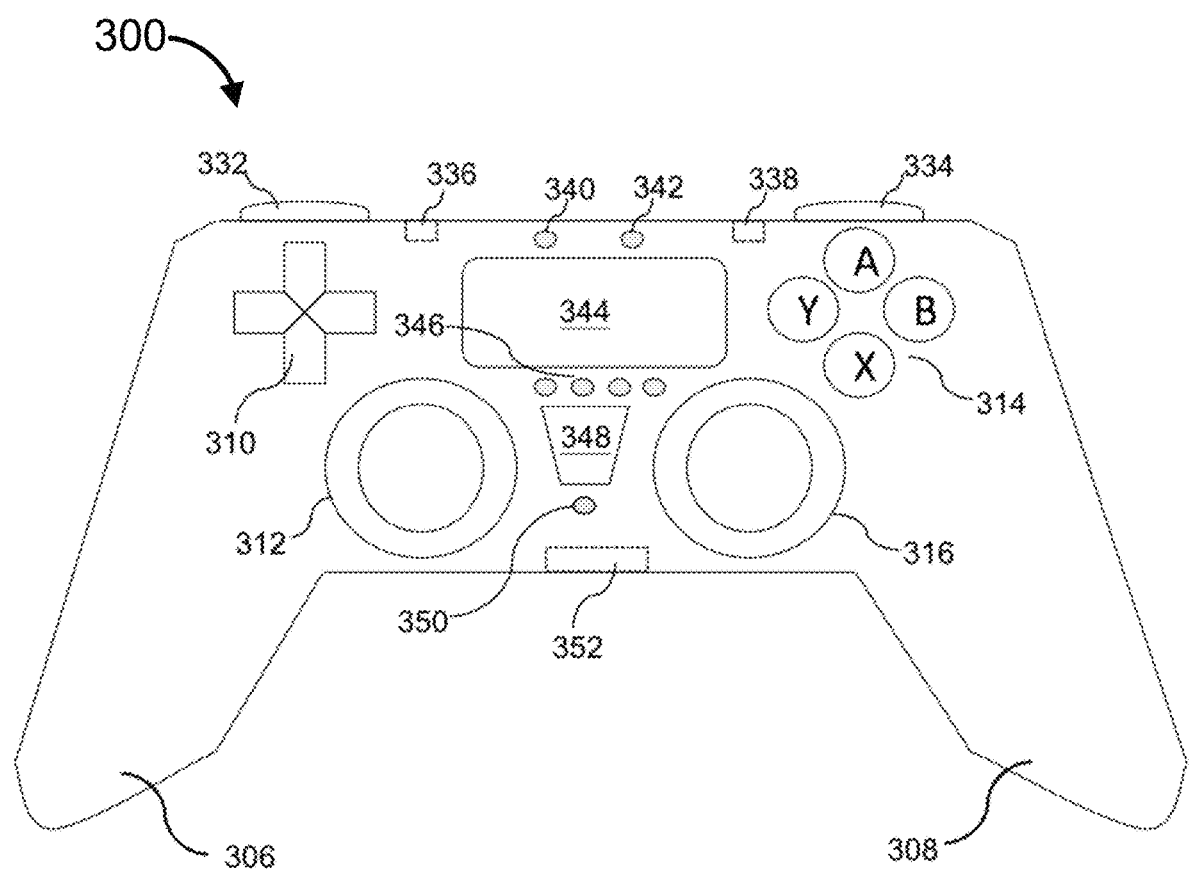
FIG. 3 shows a top view of a game controller in accordance with an example embodiment.

FIG. 3 shows a top view of a game controller 300 in accordance with an example embodiment. The game controller 300 has a body or housing with a first side 306 and a second side 308. A plurality of buttons are disposed or arranged on the body including for example, but not limited to, a power button 340, guide buttons 346, directional buttons 310, face buttons 314, a left analog stick button 312, a right analog stick button 316, a left trigger button 332 and a right trigger button 334. These buttons are designed to fulfill various functions. By way of example, the power button 340 controls the ON and OFF states of the game controller 300. The guide buttons 346 navigate game menus. The directional buttons 310 control the movement of a game character in different directions. The face buttons 314 control complex actions of a game character such as jumping and making big moves during a fighting game for example. The analog stick button 312 and 316 move game objects and rotate the camera in a game scene as well as a variety of other functions depending on the game. The trigger buttons 332 and 334 fulfill functions such as attacking and firing. A person of ordinary skill in the art would appreciate that the functions as described are only illustrative and the buttons can be designed with flexibility in terms of a variety of aspects such as position, function, shape and size.

In an example embodiment, the game controller 300 includes a rechargeable battery (not shown) within the body and a USB jack 336 that charges the battery by connecting or coupling the battery to a power source or a battery charger. By way of example, the game controller 300 includes a light emitting diode (LED) indicator 342 that indicates the charging status for the battery.

As shown in FIG. 3 as an example, the game controller 300 includes a USB jack 338 that establishes communication with electronic devices and peripherals. By way of example, under circumstance such as for a high end VR display, the USB 338 is used to reduce the latency effect by taking over part of data communication between the game controller 300 and the VR display.

In an example embodiment, the game controller 300 includes a LCD monitor 344 disposed or arranged on the body of the game controller 300. The LCD monitor 344 provides a gaming interface that displays game images of a software game when a user plays the software game.

In an example embodiment, the game controller 300 includes a SIM card port 352 that receives a SIM card and enables the user to be provided with a paid network service from a service provider. For example, the game controller 300 is provided with a 4G LET service from a network provider and thus is able to connect to a network such as the Internet even at a place where a Wi-Fi hotpot is absent.

In another example embodiment, the game controller 300 includes one or more other components or elements. As an example, the game controller 300 includes a speaker 348. The speaker 348 plays sounds generated from a software game while a user plays the software game. As another example, the game controller 300 includes a microphone 350. The microphone 350 enables a user or gamer of the game controller 300 to talk with other online gamers. For example, when a user or gamer plays an online game with the game controller 300, the microphone 350 receives spoken language or voice from the user such that the game controller 300 wirelessly transmits or conveys the spoken language or voice over a network to other payers or gamers at another terminal of the network.

Figure 4:
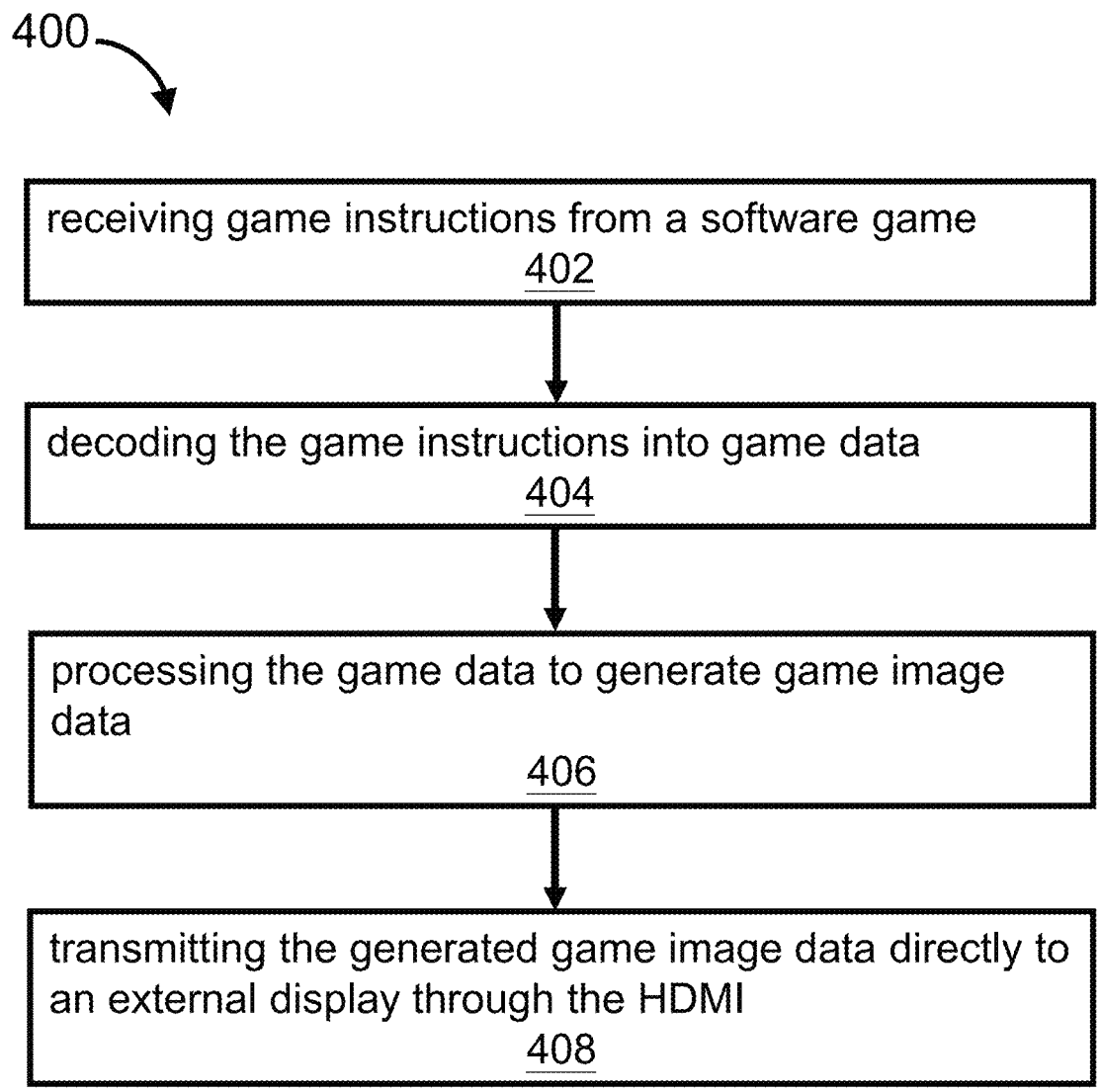
FIG. 4 shows a method that is executed by a game controller in accordance with an example embodiment.

The game controller 300 runs on a variety of platforms such as the Microsoft mobile platform and the Android mobile platform. The game controller 300 supports various software including, but not limited to, Microsoft office, email, and browser such as Chrome. As an example, the game controller 300 embeds a software converter that converts a 2D game to SBS VR content FIG. 4 shows a flow chart 400 executed by a game controller in accordance with an example embodiment.

At Block 402, a CPU of the game controller receives game instructions from a software game that is stored in a memory of the game controller. Both the CPU and the memory are disposed or arranged on a motherboard of the game controller. In another example embodiment, these components can be arranged on separate PCBs that communicate with each other.

As an example, one or more software games are pre-stored in the memory. As another example, when connecting to the Internet, the game controller downloads a software game from an Internet server and stores the game in the memory. By way of example, the stored software game is updated automatically or manually when a new version of the software game is detected.

At Block 404, the CPU decodes or processes the game instructions into game data. The game data includes drawing instructions that render video imagery of gameplay of the software game At Block 406, a GPU disposed on the motherboard processes the game data received from the CPU in order to generate game image data. The game image data are the rendered image frames of the software game.

At Block 408, the generated game image data is transmitted directly through a HDMI of the game controller to an external display that the user watches to play the software game.

Figure 5:
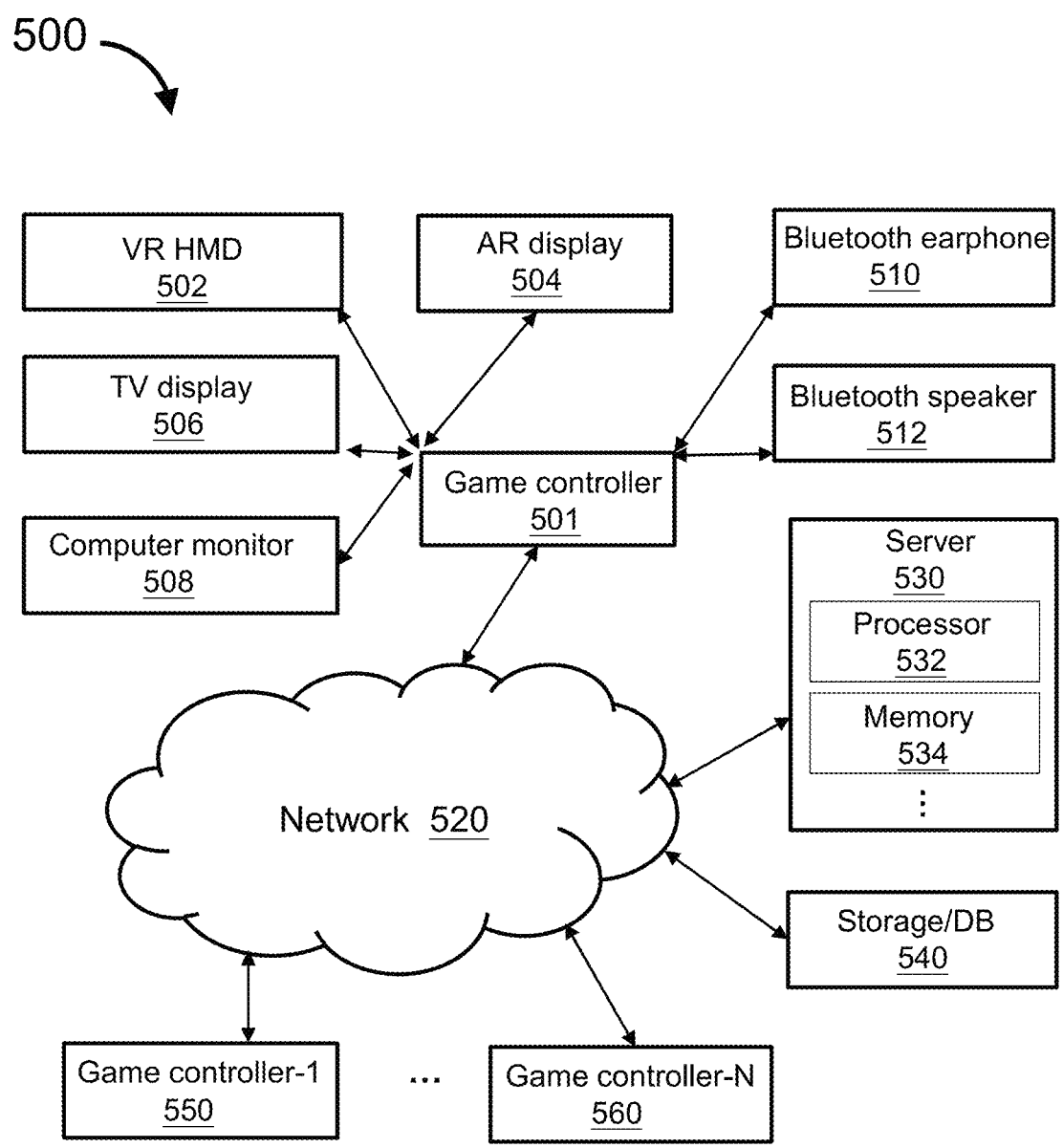
FIG. 5 shows a block diagram of a network system with game controllers in accordance with an example embodiment.

In the method 400, the game controller executes or processes a software game directly with its CPU and GPU without the necessity of an external computing device as intermediary or assistance. The game controller transmits or conveys the generated game image data directly to an external display such that the game image is viewable for the user that watches to play the software game FIG. 5 shows a block diagram of a network system 500 with game controllers in accordance with an example embodiment. A game controller 501 connects or couples to a network 520 that connects to a server 530 with a processor 532 and a memory 534 as well as a storage/database (DB) 540. For example, the network 520 is the Internet or a wireless cellular network. As shown in FIG. 5 as an example, a plurality of game controllers, game controller-1 550 . . . game controller-N 560 connects or couples to the network 520.

In an example embodiment, the game controller 501 includes a body that can be controlled with a single hand or with two hands.

With connection to the Network 520, by way of example, the game controller 501 downloads a software game from the Server 530 and updates an existing software game that is stored in the game controller 501. As an example, using the game controllers, a user plays an online game with other gamers or players. As another example, the game controller 501 enables a user to play online movies or other video programs.

As shown in FIG. 5 for example, the game controller 501 is in data communication with a VR HMD 502, an AR display 504, a TV display 506, and a computer monitor 508 thought respective HDMI. In this manner, the game controller 501 transmits the game image data that are generated with a CPU and a GPU of the game controller 501 directly to the external display or monitor such that the user watches to play the software game. In an example embodiment, the HDMI is a wireless HDMI with an embedded wireless HDMI transmitter. In this manner, for example, the game controller 501 is able to transmit or convey the game image data wirelessly to an external display with a wireless HDMI receiver.

As shown in FIG. 5 for example, the game controller 501 communicates with a Bluetooth earphone 510 and a Bluetooth speaker 512. This expands the functionality of the game controller 501 and improves flexibility and user experience As used herein, the terms "software game" or "game" refers to a video game or an electronic game that involves human interaction with a user interface to generate visual feedback on a screen or display, a movie, or other video format or programs that can be played and visually presented for a user or player.

As used herein, the terms "display" or "monitor" or "screen" refers to an electronic device for the visual presentation of data or images including but not limited to a VR HMD, an AR display, a TV display or screen and a computer monitor.

As used herein, the terms "memory" refers to any suitable memory that can be used here. It includes non-volatile memory and/or volatile memory. For example, it can include cache memory, Random Access Memory (RAM) and/or Read-Only Memory (ROM) among other types of tangible, non-transitory physical memory. It can also refer to more than one of each type of memory, and in this case, such memories are collectively represented by the memory as stated above.

Although example embodiments have been described above, it would be appreciated by a person of ordinary skill in the art that the description is merely illustrative rather than limiting. For example, the buttons and other elements shown in FIG. 3 do not indicate the actual size and positions of these buttons and elements. It will be appreciated by a person of ordinary skill in the art that various modifications and changes may be made from the above description, which will fall within the scope and spirit of the example embodiments.

What is claimed is:

1. A game controller that executes a software game and transmits game image data directly to an external display that a user watches to play the software game, comprising:
a body having buttons actuated with a hand of a user;
a battery that supplies power to the game controller; and
a motherboard that includes:
a memory that stores the software game;
a central processing unit (CPU) that fetches game instructions from the software game and decodes the instructions into game data;
a graphics processing unit (GPU) that communicates with the CPU and executes the game data received from the CPU in order to generate the game image data;
a High-Definition Multimedia Interface (HDMI) that establishes data communication with the external display and transmits the game image data directly to the external display that the user watches to play the software game;
a wireless Microcontroller Unit (MCU) that establishes Wi-Fi connection with a wireless network; and
a Bluetooth MCU that establishes Bluetooth connection with a Bluetooth enabled device,
wherein the CPU and the GPU execute the software game to generate the game image data that transmits through the HDMI directly to the external display that the user watches to play the software game, and
wherein the GPU generates the game image data instead of an external computing device and transmits the game image data through the HDMI directly to the external display.

2. The game controller of claim 1, wherein the battery is rechargeable, and the game controller further comprises:
a first Universal Serial Bus (USB) jack that charges the battery; and
a second USB jack that communicates with an external electronic device.

3. The game controller of claim 1, further comprising:
a Liquid Crystal Display (LCD) monitor that displays game images of the software game while the user plays the software game.

4. The game controller of claim 1, further comprising:
a Subscriber Identity Module (SIM) card port that receives a SIM card and enables the user to be provided with a paid network service from a service provider.

5. The game controller of claim 1, further comprising:
a speaker that plays sounds from the software game while the user plays the software game.

6. The game controller of claim 1, further comprising:
a microphone that receives, while the user plays the software game, spoken language from the user, wherein the game controller wirelessly transmits the spoken language over a network to other game controllers playing the software game.

7. The game controller of claim 1, wherein the HDMI is a wireless HDMI with an embedded wireless HDMI transmitter.

8. The game controller of claim 1, wherein the external display is one of a virtual reality (VR) head mounted display (HMD), an augmented reality (AR) display, a television (TV) display and a computer monitor.

9. The game controller of claim 1, further comprising:
a software converter that converts a two-dimensional (2D) game to Side by Side (SBS) VR content.

10. A game controller that executes a software game and transmits game image data directly to an external display that a user watches to play the software game, comprising:
a housing with a cover and a base;
control buttons actuated with a hand of a user;
a battery; and
a motherboard that includes a memory, a central processing unit (CPU), a graphics processing unit (GPU), a High-Definition Multimedia Interface (HDMI), a wireless Microcontroller Unit (MCU), and a Bluetooth MCU,
wherein the CPU retrieves and executes game instructions from the software game that is stored in the memory to generate game data and transmits the game data to the GPU that processes the game data to generate game image data,
wherein the game image data is created directly by the GPU of the game controller instead of the external computing device, and wherein the HDMI establishes data communication with the external display and transmits the game image data directly to the external display that the user watches to play the software game.

11. The game controller of claim 10, wherein the battery is rechargeable, and the game controller further comprises:
a first Universal Serial Bus (USB) jack that charges the battery; and
a second USB jack that communicates with an external electronic device.

12. The game controller of claim 10, further comprising:
a Liquid Crystal Display (LCD) monitor that displays game images on the game controller.

13. The game controller of claim 10, further comprising:
a Subscriber Identity Module (SIM) card port that receives a SIM card and enables the user to be provided with a paid network service from a service provider.

14. The game controller of claim 10, further comprising:
a speaker that plays sounds from the software game while the user plays the software game.

15. The game controller of claim 10, further comprising:
a microphone that receives, while the user plays the software game, spoken language from the user that transmits to other game controllers playing the software game.

16. The game controller of claim 10, wherein the HDMI is a wireless HDMI with an embedded wireless HDMI transmitter.

17. The game controller of claim 10, wherein the external display is one of a virtual reality (VR) head mounted display (HMD), an augmented reality (AR) display, a television (TV) display and a computer monitor.

18. The game controller of claim 10, further comprising:
a software converter that converts a two-dimensional (2D) game to Side by Side (SBS) VR content.

* * * * *